Dec. 30, 1947.  C. J. T. YOUNG  2,433,503
POLARIZED HEADLIGHTING SYSTEM FOR AUTOMOTIVE VEHICLES
Filed July 3, 1945
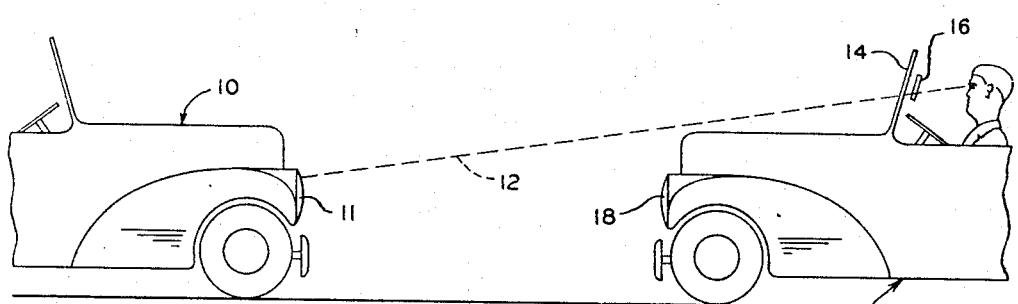
FIG. 1
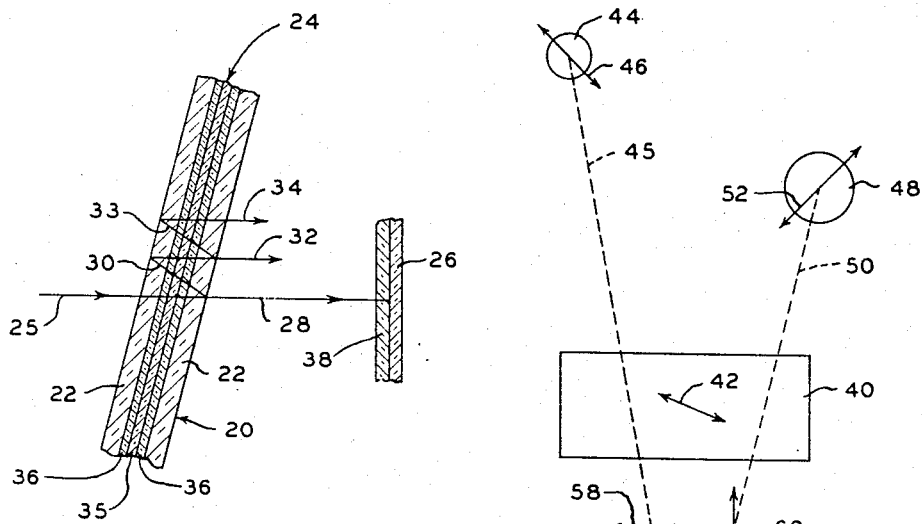
FIG. 2
FIG. 3
INVENTOR.
Clinton J. T. Young
BY Donald L. Brown
Attorney Patented Dec. 30, 1947

2,433,503

UNITED STATES PATENT OFFICE 2,433,503

POLARIZED HEADLIGHTING SYSTEM FOR AUTOMOTIVE VEHICLES

Clinton J. T. Young, Cambridge, Mass., assignor to Polaroid Corporation, Cambridge, Mass., a corporation of Delaware Application July 3, 1945, Serial No. 602,993

2 Claims. (Cl. 88—65)

This invention relates to polarized headlighting system for automobiles or other vehicles, and more particularly to windshields for use in vehicles employing such systems.

It has been proposed that polarized light be employed in the elimination of vehicle headlight glare and to this end it has been suggested that all motor vehicles be provided with headlights emitting polarized light vibrating at an angle of 45° to the vertical and be equipped also with suitable polarizing analyzer means adapted to block polarized light from the headlights of another similarly equipped vehicle approaching from the front. The preferred type of analyzer means may comprise either polarizing spectacles or a polarizing visor mounted within the vehicle in such manner that it may be readily moved into and out of operative position. Such a system is highly efficient for light directly transmitted by a vehicle windshield, but a difficulty arises with light internally reflected within the windshield and then repropagated toward the analyzer means, in that such reflection tends to cause alteration of the polarization characteristics of the re-reflected light such that a considerable fraction thereof cannot be properly extinguished by the analyzer means.

The present invention is concerned with the above-outlined problem, and it is a primary object thereof to provide means for preventing glare arising from the above cause.

Another object is to prevent glare arising as outlined above by providing windshields used in vehicles using polarizing headlighting with fractional wave retardation means, and more particularly with a half-wave retardation element, adapted to counteract the effect of internal reflection of polarized light transmitted by said windshield.

A further object is to provide improved analyzer means cooperating with said fractional wave retardation means for substantially completely extinguishing polarized light transmitted by said windshield.

Additional objects and advantages will in part appear and in part be pointed out in the course of the following detailed description of certain embodiments of the invention, which are given as nonlimiting examples, in connection with the accompanying drawings, in which:

Figure 1 is a diagrammatic fragmentary side view of automobiles equipped with headlights and analyzer means and illustrating the situation giving rise to the problem with which the present invention is concerned;

Figure 2 is a diagrammatic sectional view of a windshield and visor embodying a form of the invention; and Figure 3 is a somewhat schematic view of an optical system embodying the invention and illustrating the operation thereof.

In Fig. 1 automobile 10 is illustrated as provided with headlights 11 emitting polarized light vibrating at an angle of 45° to the vertical and which, as indicated by dotted line 12, is incident upon windshield 14 in car 15. Within car 15 there is shown a polarizing visor 16, and it will be understood that said visor is arranged to absorb or block polarized light incident thereon from headlights 11. It will also be understood that car 15 is provided with headlights 18 adapted to emit polarized light of the same characteristics as that emitted by headlights 11. Such a polarized headlighting system is described and explained in detail in United States Patents Nos. 2,031,045 and 2,087,795.

Fig. 2 illustrates in detail the problem with which the present invention is concerned and the solution provided therefor. When polarized light is obliquely incident upon a reflecting surface, its polarization characteristics may be materially altered by reflection, depending upon the relation between its vibration plane and its plane of incidence, i. e., the plane which is normal to the reflecting surface and which contains the incident light, or, otherwise defined, the plane defined by the incident ray and the reflected ray. If the vibration plane, or vibration direction, of the light is parallel or perpendicular to its plane of incidence which may be conveniently termed as the nonalteration optimum condition or position substantially no alteration of the polarization characteristics of the light will occur, but under any other conditions said polarization characteristic may be materially altered as a result of unequal reflection of the resolved components parallel and perpendicular to the plane of incidence of said light.

In Fig. 2, windshield 20 corresponds to windshield 14 in Fig. 1 and comprises a pair of glass layers 22 bonded together through a composite adhesive layer 24 described in more detail hereinafter. Ray 25 represents light incident on windshield 20 from the polarizing headlights of an approaching vehicle as illustrated at 12 in Fig. 1. Most of said light will be directly transmitted by windshield 20 and propagated towards analyzer 26, as illustrated by ray 28. Some of said light, however, will be internally reflected at the inner surface of windshield 20, as indicated by ray 30, and then re-reflected towards analyzer 26, as illustrated by ray 32, and this operation is repeated a substantial number of times with diminishing intensity, as illustrated by rays 33 and 34. It will of course be understood that there will also be reflection of ray 25 at the outer surface of the windshield and that a certain amount of rays 30 and 33 will be transmitted through said surface instead of being reflected as rays 32 and 34 but this light is lost and may be disregarded. It will also be apparent that there may be some reflection at the interfaces of layers 22 and 24 if the refractive indices of said layers fail to match accurately, but this amount of reflection is relatively insignificant compared with that at the glass-air interfaces. There may also be some refraction at said interfaces and there will be some at the glass-air interfaces, but this factor does not affect the operation of the invention and it is accordingly not illustrated in the drawing.

The present invention is concerned with the fact that the light represented by rays 32 and 34 may have its polarization characteristics substantially altered by its internal reflection and may therefore not be completely blocked by analyzer 26 set to block rays 25 and 28. As is indicated in Fig. 1, the beam represented by ray 12 which ultimately reaches the eyes of the driver of car 15 will usually be travelling somewhat upward with respect to the horizontal. Furthermore it is now conventional practice to mount a windshield tilted a substantial degree from the vertical, as in the case of windshield 14 in Fig. 1. The net result of this is that a ray such as ray 25 is incident on the windshield at an angle substantially removed from the normal, and at such angles reflection from both surfaces of the windshield would be considerable, with the result that rays 32 and 34 may represent a substantial fraction of ray 25. Since ray 25 is assumed to be polarized with its vibration plane at 45° to the vertical, it will be apparent that said vibration plane and the plane of incidence of said ray on windshield 20 will be neither parallel nor perpendicular but may be at a relatively sharp angle to each other, particularly in the case of a one-piece windshield. The result will be that rays 32 and 34 will have their polarization characteristics substantially altered from those of rays 25 and 28, and a substantial portion of said rays will be transmitted by analyzer 26 set to extinguish rays 25 and 28 and will thereby cause a substantial amount of undesirable glare.

In accordance with the present invention, this glare light is substantially minimized by providing means for rotating the vibration plane of the polarized light of the headlights of an approaching vehicle to such a degree that it is substantially parallel or perpendicular with its plane of incidence on the windshield and by providing also modified analyzer means compensating for this change in vibration plane. Thus in Fig. 2 layer 35 represents half-wave retardation material, such for example as a sheet of molecularly oriented cellulose acetate or a vinyl compound such as polyvinyl alcohol, bonded between glass layers 22 by means of adhesive layers 36, which may comprise any of a variety of suitable materials, for example an incomplete polyvinyl acetal resin such as polyvinyl butyral. Half-wave layer 35 should be so positioned that one of the principal vibration directions therein substantially bisects one of the angles defined by the vibration plane of ray 25 and the plane of incidence of said ray on windshield 20 or the angle between said vibration plane and a plane at right angles to said plane of incidence of ray 25. To state it more specifically, this means that one of the principal vibration directions in half-wave layer 35 should be so positioned that the angle defined by it and the vibration plane of ray 25 is substantially equal to one-half the angle defined by the plane of incidence of said ray on windshield 20 and said vibration plane. For example, if the vibration plane of ray 25 is at 45° to the vertical in a clockwise direction, one of the principal vibration directions in half-wave layer 35 may be positioned at an angle of 22½° to the vertical in either a clockwise or counter-clockwise direction, provided windshield 20 is tilted only about a horizontal axis. If the windshield is tilted also about a vertical axis, as is frequently the case when split windshields are employed, the positioning of layer 35 with respect to the principal vibration directions therein depends upon the degree of tilt of the windshield and is determined as explained above by the relation between the vibration plane of ray 25 and its plane of incidence on the windshield. Layer 38 adjacent analyzer 26 represents a second half-wave retardation element, which is preferably placed with its principal vibration directions substantially at right angles to the corresponding principal vibration directions in half-wave layer 35 in order to correct for chromatic dispersion of birefringence in layer 35. The operation of this system is more readily explained in connection with the schematic diagram in Fig. 3.

Element 40 in Fig. 3 corresponds to windshield 20 and arrow 42 represents one of the principal vibration directions in the half-wave layer in windshield 40 and is positioned at an angle of substantially 22½° to the horizontal. Element 44 corresponds to one of headlights 11 in Fig. 1, and dotted line 45 represents light emitted by headlight 44 and incident on windshield 40, with the vibration plane thereof being at 45° to the vertical as indicated by arrow 46. Element 48 corresponds to one of headlights 18 in Fig. 1 and represents one of the headlights of the car wherein windshield 40 is mounted. Dotted line 50 represents light from headlight 48 reflected back towards windshield 40 and having its vibration plane at 45° to the vertical and crossed with the vibration plane of the light from headlights 44, as indicated by arrow 52. Element 54 corresponds to analyzer 26 in Fig. 2 and the axis thereof is indicated by arrow 55 as being at 45° to the vertical and substantially crossed with arrow 46. Arrow 56 represents the principal vibration direction of a half-wave plate positioned between analyzer 54 and windshield 40 corresponding to the principal vibration direction represented by arrow 42, and arrow 56 is accordingly shown as positioned at an angle of 22½° to the vertical and therefore at right angles to arrow 42.

When ray 45 from headlight 44 passes through the half-wave plate within windshield 40 its vibration plane is rotated through twice the angle between arrows 42 and 46, and it accordingly emerges from said half-wave layer vibrating in a horizontal plane, as is indicated by arrow 58. It follows therefore that the vibration plane of said light will be substantially perpendicular to its plane of incidence on the inner surface of windshield 40, and the reflected component thereof corresponding to ray 30 in Fig. 2 will suffer substantially no alteration of its polarization characteristics. At the same time, the transmitted portion will be restored to its original vibration plane by passage through the half-wave plate in front of analyzer 54, and said light will accordingly be blocked by said analyzer. The reflected portion of ray 45 which corresponds to ray 30 in Fig. 2 will similarly be restored to its original vibration plane when it again passes through the half-wave plate within the windshield and the re-reflected portion thereof corresponding to ray 32 in Fig. 2 will suffer some alteration of its polarization characteristics but the undesired component thereof will have only approximately half the intensity it would otherwise have in the case of a conventional windshield. Furthermore said re-reflected ray will pass a third time through the half-wave layer within the windshield and this will to a considerable extent compensate for its second passage therethrough. This effect and result will be repeated for the light corresponding to rays 33 and 34 in Fig. 2 and so on, but this light represents a very small fraction of the total of ray 45 and the alteration of its polarization characteristics will also be only approximately half that in the conventional windshield.

The above system does not in any way reduce the illumination by the headlights of the car wherein the windshield of the invention is mounted. On the contrary, it is if anything slightly increased. When the polarized light from headlight 48 is reflected back through windshield 40 with its polarization characteristics substantially unaltered, as represented by dotted line 50, its vibration plane will be rotated to a substantially vertical position as indicated by arrow 60. However, it will be restored to its original vibration plane by passage through the half-wave plate in front of analyzer 54, and said light will accordingly be transmitted by analyzer 54 as if the half-wave elements had not been present. At the same time, alteration of the polarization characteristics of ray 50 by reflection within windshield 40 will be substantially decreased in the same manner as described above in connection with ray 45, with the result that a larger proportion of ray 50 will be transmitted by analyzer 54 than would otherwise be the case.

The foregoing system is subject to considerable variation without departing from within the scope of the invention. For example half-wave layer 35 need not be positioned within windshield 20 but may be bonded thereto in any desired way. In a further modification, half-wave layer 35 may be positioned in spaced relation with the front of the windshield and preferably substantially at right angles to the light incident thereon from the headlights of an approaching car. Since with this arrangement the incident light will pass through the half-wave plate only once, it will remain with its vibration direction rotated to the plane of minimum alteration, with the result that all of the light ultimately reaching the analyzer will have its polarization characteristics substantially uniform. It will also be apparent from Fig. 3 that in place of the combined analyzer and half-wave plate there may be used a single analyzer having its axis substantially vertical in which case it will transmit the light from headlight 48 vibrating parallel to arrow 60 and will block the light from headlight 44 vibrating parallel with arrow 58. This arrangement has the advantage that the analyzer may be a pair of spectacles of the type conventionally sold for daytime use under the tradename "Polaroid" for blocking reflected glare from the sun. On the other hand, since the reflected glare from sunlight is generally polarized to vibrate horizontally, its vibration plane will be rotated by passage through the half-wave plate within windshield 40 to a position at 45° to the vertical and parallel with arrow 46, and in order to block it most efficiently it will be desirable to use an analyzer 54 having its axis in the same direction as indicated by arrow 55 but without a second half-wave plate. A particularly useful visor device for both day and night use in the system of the invention will be constructed as shown in Fig. 2 and mounted for rotation about a horizontal axis, with the axis of polarizer 26 being vertical and the principal vibration direction of half-wave plate 38 corresponding to the principal vibration direction in windshield 40 represented by arrow 42 being substantially at right angles to arrow 42, or parallel thereto, when said half-wave plate is foremost. With this arrangement, when polarizer 26 is adjacent the windshield it will operate in the manner above described for night driving, and when the half-wave plate 38 is foremost it will operate similarly to eliminate reflected glare from the sun. It will of course be apparent that in Fig. 3 the principal vibration direction of the half-wave layer in windshield 40 represented by arrow 42 may be positioned at 22½° to the vertical instead of to the horizontal in which case the vibration plane of ray 45 would be rotated to the vertical and the vibration plane of ray 50 would be rotated to the horizontal. Analyzer 54 will accordingly be modified to take care of this change, and any further such modifications are to be understood as coming within the scope of the invention.

It is to be understood that the practice of the present invention is not limited to the use of birefringent half-wave material and that optically active rotatory material such as quartz may be employed within the scope of the invention. It should be noted that when reference is made herein to the vibration directions in a half-wave element, it should be understood as applying to the vibration directions in said element for light traversing said element along the path followed by the light from the headlights of an approaching vehicle after any refraction which may occur at the first surface. If said vibration directions differ from those for normally incident light, this should be taken into account in positioning said element, as will be understood by those skilled in the art. It will also be understood that in embodiments of the invention utilizing only a single half-wave element, preferred results will be obtained with material as highly achromatic as possible, and this is true whether birefringent or optically active material is employed.

Since certain changes may be made in the above construction and different embodiments of the invention could be made without departing from the scope thereof, it is intended that all matter contained in the above description or shown in the accompanying drawings shall be interpreted as illustrative and not in a limiting sense.

What is claimed is:

1. In a system for the reduction of glare from the headlights of automotive vehicles and the like wherein the light emitted by said headlights is plane polarized to vibrate in a predetermined direction at an acute angle to the horizontal, the combination with a light-polarizing analyzer positioned before the eyes of the driver of a vehicle utilizing the said system and adapted substantially to block polarized light incident thereon from the headlights of an approaching vehicle employing said system, of a windshield mounted on said first-mentioned vehicle and positioned directly in front of said analyzer and between said analyzer and the source of polarized light incident thereon, said windshield being inclined to the vertical whereby light from said headlights is incident thereon at an acute angle, said windshield comprising a plurality of glass sheets bonded together by an adhesive layer, said layer comprising a half-wave retardation element having its principal optical directions lying in a plane substantially parallel to the surface of said windshield and extending in directions perpendicular to one another, and means for so positioning said half-wave retardation element within said windshield that one of the principal optical directions of said half-wave retardation element makes an angle with the extinction axis of said analyzer equal substantially to one-half the angle defined by said axis and the plane of incidence upon said windshield of light from the headlights of an approaching vehicle whereby the vibration direction of polarized light incident on said windshield and internally reflected from the surface of said windshield most closely adjacent the driver of the vehicle equipped with said windshield remains substantially unaltered.

2. A combination in accordance with the preceding claim wherein the analyzer comprises a light-polarizing element and a half-wave retardation element positioned on the surface thereof adjacent the windshield of the vehicle, said half-wave retardation element being positioned with its principal optical directions substantially perpendicular to the corresponding principal optical directions of the half-wave retardation element associated with the windshield and the light-polarizing element of the analyzer being positioned with its transmission axis at substantially the same angle to the vertical as the vibration direction of light emitted from the headlights of said vehicle makes with the horizontal.

CLINTON J. T. YOUNG.

REFERENCES CITED

The following references are of record in the file of this patent:

UNITED STATES PATENTS

| Number | Name | Date |
| --- | --- | --- |
| 1,767,831 | Berek | June 24, 1930 |
| 2,102,632 | Land | Dec. 21, 1937 |
| 2,189,270 | Pineo | Feb. 6, 1940 |
| 2,237,565 | Land | Apr. 8, 1941 |
| 2,303,906 | Benford et al. | Dec. 1, 1942 |
| 2,313,923 | Chubb | Mar. 16, 1943 |
| 2,318,705 | Morgan | May 11, 1943 |
| 2,351,797 | Young | June 20, 1944 |